United States Patent
Apdalhaliem et al.

(10) Patent No.: US 9,527,126 B2
(45) Date of Patent: Dec. 27, 2016

(54) MANUFACTURING COMPOSITE TUBULAR STRUCTURES USING ADJUSTABLE CYLINDRICAL MECHANICAL PRESSURE DEVICE AND PROCESS

(71) Applicant: The Boeing Company, Chicago, IL (US)

(72) Inventors: Sahrudine Apdalhaliem, Seattle, WA (US); Waeil M. Ashmawi, Bellevue, WA (US); Moushumi Shome, Kent, WA (US); Jeffery Lee Marcoe, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 14/328,702

(22) Filed: Jul. 11, 2014

(65) Prior Publication Data

US 2016/0008868 A1 Jan. 14, 2016

(51) Int. Cl.
| | | |
|---|---|---|
| *B21D 51/10* | (2006.01) | |
| *B21D 39/04* | (2006.01) | |
| *B32B 5/02* | (2006.01) | |
| *B32B 15/14* | (2006.01) | |
| *B32B 15/20* | (2006.01) | |
| *B32B 1/08* | (2006.01) | |

(52) U.S. Cl.
CPC .............. *B21D 39/04* (2013.01); *B32B 1/08* (2013.01); *B32B 5/024* (2013.01); *B32B 15/14* (2013.01); *B32B 15/20* (2013.01); *B32B 2260/021* (2013.01); *B32B 2260/046* (2013.01); *B32B 2307/302* (2013.01); *B32B 2597/00* (2013.01); *Y10T 29/49771* (2015.01); *Y10T 29/49776* (2015.01)

(58) Field of Classification Search
CPC .......... B21C 37/06; B32B 15/14; B32B 5/024; B32B 1/08; B32B 15/20; B32B 2307/302; B32B 2260/021; B32B 2260/046; B32B 2597/00; B21D 39/04; Y10T 29/49771; Y10T 29/49776
See application file for complete search history.

(56) References Cited

U.S. PATENT DOCUMENTS

| | | | |
|---|---|---|---|
| 7,137,617 B2 * | 11/2006 | Sjostedt | B32B 1/08 24/136 L |
| 9,174,393 B2 * | 11/2015 | Bartel | B29C 70/462 |

* cited by examiner

*Primary Examiner* — John C Hong
(74) *Attorney, Agent, or Firm* — Yee & Associates, P.C.

(57) ABSTRACT

A system for manufacturing a composite tubular structure. The system includes an outer tube configured to remain rigid up to at least a first threshold pressure. The system includes an inner tube internal to the outer tube and substantially coaxial with the outer tube. The inner tube has a first outer surface and a first inner surface. The inner tube is configured to remain rigid up to a second threshold pressure that is less than the threshold first pressure. The system includes a composite tubular layup laid on the first outer surface of the inner tube. The system includes an assembly of a plurality of separate segments disposed inside the inner tube, each segment adjacent to two other segments, to form a segmented inner cylinder having a second outer surface of a cylindrical shape and an inner channel of a first conical shape.

19 Claims, 10 Drawing Sheets

MANUFACTURING COMPOSITE TUBULAR STRUCTURES USING ADJUSTABLE CYLINDRICAL MECHANICAL PRESSURE DEVICE AND PROCESS

BACKGROUND INFORMATION

1. Field

The present disclosure relates generally to manufacturing substantially uniform composite tubular structures while maintaining uniform temperature and pressure during consolidation.

2. Background

Manufacturing thick composite tubular structures while maintaining uniform temperature and pressure during the consolidation process is difficult. However, failure to maintain uniform temperature and processor during consolidation may lead to inconsistencies and deformities in the final product. Such inconsistencies and deformities may mean that the resulting composite tubular structure is not substantially uniform and thus may not be suitable for its intended purpose, and may be discarded. Discarded tubes may represent an undesirable waste of time, money, material, and other resources.

Currently known techniques for manufacturing substantially uniform, thick composite tubular structures are not as reliable as desired. Thus, a need exists for improved methods and devices for manufacturing substantially uniform, thick composite tubular structures more reliably.

SUMMARY

The illustrative embodiments include a system for manufacturing a composite tubular structure. The system includes a first tube of a first diameter and configured to remain rigid up to at least a first pressure. A second tube is internal to the first tube and substantially coaxial with the first tube. The second tube has a first outer surface and a second diameter less than the first diameter. The second tube is configured to remain rigid up to a second pressure that is less than the first pressure. A composite tubular layup is laid on the first outer surface of the second tube and placed inside the first tube. A plurality of separate segments is disposed inside the second tube. Each segment is adjacent to other segments to form a segmented inner cylinder having a second outer surface of a cylindrical shape and an inner channel of a first conical shape. A rod is slidably disposed within the inner channel. The rod comprises a second conical shape. The second conical shape and the first conical shape sharing a similar conical aperture.

The illustrative embodiments also provide for a method of manufacturing a composite material. The method includes inserting a rod within an inner channel of a plurality of separate segments. Each separate segment is adjacent two other separate segments. The plurality of separate segments together has a first outer surface comprising a cylindrical shape. The inner channel has a first conical shape. The rod has a second conical shape of a similar conical aperture as the first conical shape. As the rod is inserted within the inner channel the rod transmits a pressure to the plurality of separate segments and, in response, the plurality of separate segments apply about the pressure in an about uniformly distributed manner to an inner surface of a first tube. The composite material is laid up on a second outer surface of the first tube. The first tube comprises a malleable material such that the first tube expands in response to the pressure. In a subsequent response, a second pressure is applied to the composite material which is then compressed between the first tube and a third inner surface of a second tube. The method also includes varying the pressure by changing an extent to which the rod is inserted within the inner channel.

Other illustrative embodiments are possible. Thus, the above examples do not necessarily limit the claimed inventions.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
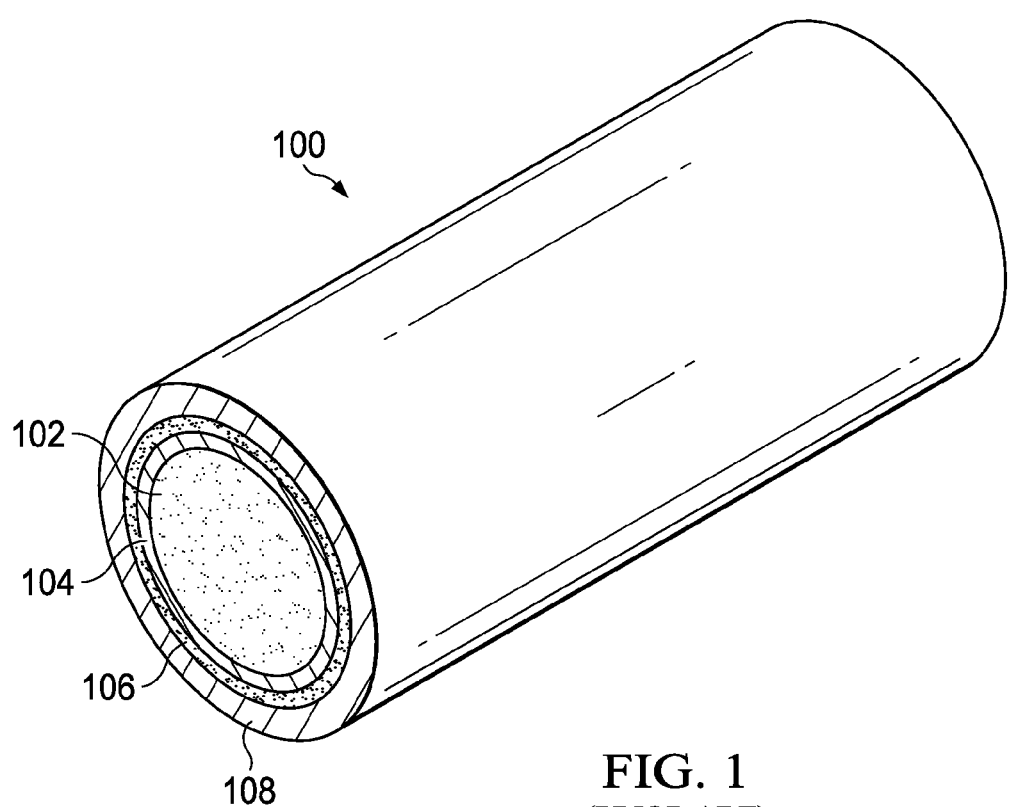
FIG. 1 illustrates a prior art device for manufacturing a thick composite tubular structure.

The illustrative embodiments provide several useful device and functions. For example, the illustrative embodiments recognize and take into account that currently available techniques for manufacturing composite tubular structures have several disadvantages. For example, when using current techniques, there may be difficulty in maintaining a uniform pressure across the entire tubular structure during manufacture. With some past techniques, pressure may not be actively controlled. Runaway pressure could have undesirable effects, and inconsistent pressure can result in undesirable shape changes in the final tubular product. Inconsistent pressure can also result in non-uniformity of the final product. If the final product is found to be not suitable for the intended purpose, then the product may be discarded or re-consolidated for other thermoset or thermoplastic uses. In either case, an unsuitable product may result in inefficiency and higher costs.

The illustrative embodiments address these and other issues present in prior techniques for manufacturing composite tubular structures. For example, the illustrative embodiments provide devices and methods for applying a consistent pressure across the entire surface of the composite tubular structure. The illustrative embodiments also provide a means for actively controlling and varying the pressure applied to the composite tubular structure during the consolidation process. The illustrative embodiments are particularly useful for forming substantially uniform, thick composite tubular structures.

As used herein, the following terms have the following definitions:

"Consolidation" is defined as the process of changing a composite layup, which is typically pre-impregnated with a resin, to a final composite product. In some cases the resin is added to a dry fiber layup prior to consolidation. Consolidation may include a curing process which includes the application of heat and/or pressure to the composite layup.

"Curing" is defined as a material process that is specifically used for processing thermoset material systems. Curing is an irreversible process, where heat is applied to a thermoset material in a temperature range of about 350 degrees Fahrenheit to about 370 degrees Fahrenheit to start a chemical reaction for a specified duration and thereby to form the material into structures of high strength. This temperature range may vary for different applications.

A "cone" is a three-dimensional geometric shape that has a continuous lateral side that tapers from a "base" defined in a single plane to a point called the "apex" of the cone. The apex is not in the same plane as the base.

A "conical shape" or the term "conical" refers to a shape that is approximately that of a cone, but may have some variation, such as a base that is not completely flat, a series of flat sides meeting at angles on the lateral surface instead of sides having a smooth curvature, or other variations. For example, a tetrahedron (pyramid) may be considered a "conical shape" under this definition. A "frustoconical" shape is also considered a "conical shape", even though the frustoconical shape ends in a flat surface instead of the point of the apex. A "conical shape" always has a base and sides that tend towards an apex, even if the apex has been truncated such that the conical shape terminates at a flat surface, such as in a frustoconical shape, and even if some of the sides are flat and others are curved. As used herein, a "frustoconical shape" includes a top surface that may not be completely flat.

A "directrix" is the perimeter of the base of a cone or a conical shape.

A "generatrix" is a line segment between the directrix and the apex. Taken together, all of the generatrix of a conical shape forms the lateral surface of the conical shape.

The "aperture" or "conical aperture" of a conical shape is the angle between two opposing generatrix. Thus, if a generatrix makes an angle "x" to the axis of the conical shape, then the aperture is "2x". If a conical shape has a series of flat surfaces that meet at angles at the lateral surface, then the conical shape will have a plurality of different apertures, corresponding to the combination of flat and curved surfaces that constitute the lateral surface of the conical shape. The aperture or apertures of a conical shape determines how steeply the lateral surface of the conical shape tends towards the apex. The farther the apex from the base, the steeper the aperture or apertures of the conical shape. If the base of a first conical shape is larger than the base of a second conical shape, then it is possible for these two conical shapes to have a similar or the same apertures, even though in total volume and height the first conical shape is larger than the second conical shape. In the case of two conical shapes each having a series of flat lateral surfaces, the two conical shapes have similar apertures if the conical apertures of the lateral surfaces of the first conical shape match or about match the corresponding conical apertures of the lateral surfaces of the second conical shape. In the simple cases of a right circular cone or a right circular frustoconical shape, each conical shape has one aperture.

A "thick" composite tubular structure is defined as a composite tubular structure having a wall thickness that equals or exceeds about 0.25 inches at one or more locations along the longitudinal axis of the tubular structure. For purposes used herein, any composite tubular structure that has a wall thickness less than this value along the entire longitudinal axis of the tubular structure is considered to be "thin". As used herein, the terms "thick" and "thin" represent only quantitatively determinable values.

"Substantially coaxial" means that two structures share about the same axis, typically within 10% of an exact coaxial relationship.

"Substantially uniform" or "substantially uniformly" refer to quantitative values that are within an acceptable deviation from complete uniformity. Thus, for example, a "substantially uniform pressure" refers to a pressure that is evenly applied across a surface, though may deviate from perfectly evenly applied pressure by an acceptable deviation. Likewise, a "substantially uniform thickness" refers to a thickness of an object that does not vary along a length of the object, within an acceptable deviation. Typically an "acceptable deviation" is less than about five percent, though this percentage may vary in some cases.

Attention is now turned to the Figures. FIG. 1 illustrates a prior art device for manufacturing a thick composite tubular structure.

Device 100 represents a series of structures that, taken together, may be used to form a composite tubular structure. The innermost portion of device 100 includes expandable soluble mandrel 102. Expandable soluble mandrel 102 is formed of a material that becomes reactive when exposed to high temperatures. "High temperatures" include any temperature sufficient to begin a spontaneous chemical reaction within expandable soluble mandrel 102. Typically the temperatures used in the consolidation process are high temperatures.

Just outside of expandable soluble mandrel 102 is tube 104. Tube 104 is typically aluminum, but may be other malleable metals that have a desirable thermal conductivity. Just outside of tube 104 is composite layup 106 which is to be consolidated into a composite tube. Composite layup 106 may be fibers pre-impregnated with a resin, or may be dry fibers to which a resin is later applied.

Just outside of composite layup 106 is casing 108. Casing 108 is typically steel. In use, when expandable soluble mandrel 102 is exposed to heat, the material that constitutes expandable soluble mandrel 102 expands. As a result, pressure is applied to tube 104. The pressure may be sufficient to deform tube 104, thereby applying pressure to composite layup 106. Casing 108 is fashioned of sufficient thickness or of a desirable material such that casing 108 does not deform under the pressure that composite layup 106 applies to casing 108. Thus, composite layup 106 is squeezed between tube 104 and casing 108.

Under heat and pressure, composite layup 106 undergoes consolidation. After a desired amount of time has passed, heat is removed. Eventually, expandable soluble mandrel 102 is removed. Tube 104 and composite layup 106 are then removed from casing 108, leaving a consolidated composite tubular structure. This process may be used to form thick composite tubular structures.

Figure 2:
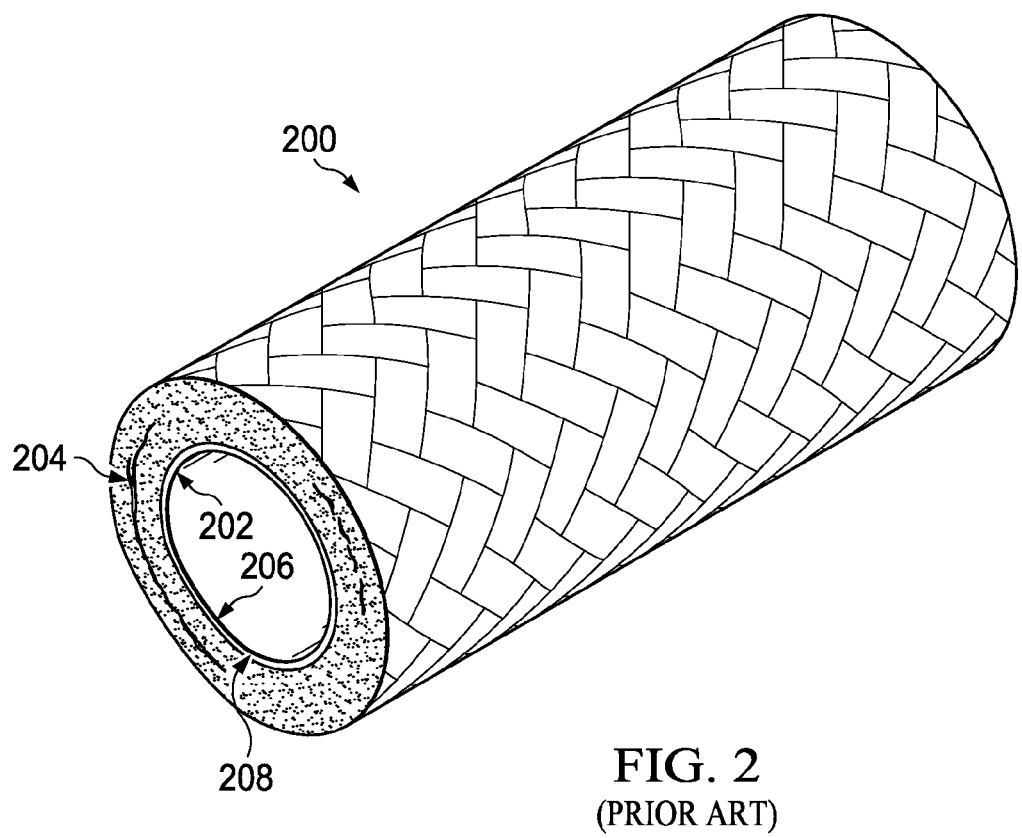
FIG. 2 illustrates one example of a composite tubular structure manufactured using the prior art device shown in FIG. 1.

FIG. 2 illustrates one example of a composite tubular structure manufactured using the prior art device shown in FIG. 1. Thus, composite tubular structure 200 may be one result of the process described above with respect to FIG. 1. For reference, tube 202 corresponds to tube 104 of FIG. 1.

In some cases, the results of the process described with respect to FIG. 1 may be undesirable due to uneven pressure applied during the consolidation process. Uneven pressure may result because the chemical reaction process inside expandable soluble mandrel 102 that generated the pressure is not entirely controllable while the chemical reaction takes place. Furthermore, this chemical reaction may take place at different rates along the length of expandable soluble mandrel 102 of FIG. 1, depending on when different sections of the expandable soluble mandrel reach a given temperature, or perhaps depending on variations in the physical properties of the expandable soluble mandrel.

FIG. 2 represents one possible undesirable result of the process described with respect to FIG. 1. Specifically, composite tubular structure 200 has two undesirable features that resulted from uneven pressure being applied during the process described with respect to FIG. 1. The first undesirable feature is that the tube may be poorly consolidated in some areas, which may result in significant loss of strength in the resulting tube. This feature is shown generally at arrow 204. The second undesirable feature is that uneven pressure may result in a non-circular and/or uneven cross section in composite tubular structure 200 that could alter the load path of the tubular structure. For example, a first curvature shown generally at arrow 206 is different than a second curvature shown generally at arrow 208.

In some cases, these curvatures may change along the longitudinal length of composite tubular structure 200, which may be a third undesirable property. Other undesirable properties may also be present as a result of uneven pressure applied during the consolidation process.

As a result, in some cases, composite tubular structure 200 may be unsuitable for its intended purpose. In these cases, composite tubular structure 200 may be significantly reprocessed in favor of a new thermoplastic material system or discarded completely as composite tubular structure 200 may not be recyclable. This result may be undesirable waste.

Accordingly, the prior art process described with respect to FIG. 1 presents several challenges. First, this process presents a difficulty in maintaining a uniform pressure to tube 104 during the consolidation process. Second, this pressure is not actively controlled. While the temperature may be controlled, thermal propagation is not always fully controllable, and variations in expandable soluble mandrel 102 may also result in uncontrolled chemical reactions. Third, if the chemical reactions in expandable soluble mandrel 102 exceed a particular rate, then excessive pressure may build within tube 104. Fourth, the chemical reaction of the soluble mandrel is irreversible, which means that waste is more likely to result with the process described with respect to FIG. 1.

The illustrative embodiments address these and other issues. Specifically, the illustrative embodiments provide devices and methods for applying even, consistent, and controlled pressure along the entire longitudinal length of tube 104 during the consolidation of composite tubular structure 200. The application of even, consistent, and controlled pressure is much more likely to result in a composite tubular structure that has a desirable shape, relative to the technique shown with respect to FIG. 1.

Figure 3:
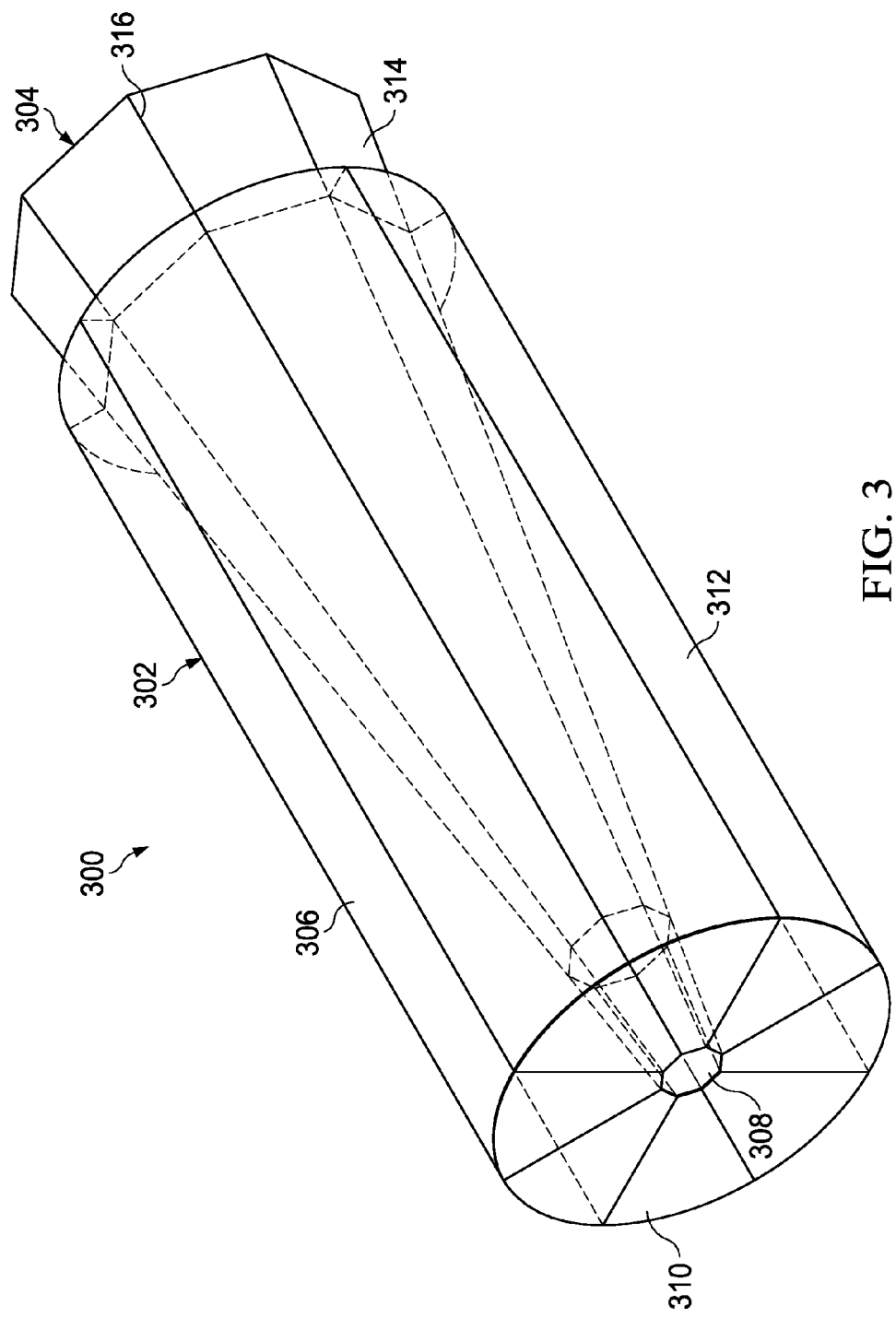
FIG. 3 illustrates an assembly for manufacturing a composite tubular structure, in accordance with an illustrative embodiment.

FIG. 3 illustrates assembly 300 for manufacturing a composite tubular structure, in accordance with an illustrative embodiment. The features of FIG. 3 relate to the two innermost portions of assembly 300 of the illustrative embodiments.

The two innermost portions of assembly 300 are segments 302 and rod 304. Segments 302 may be referred-to as a plurality of cylindrical segments. Segments 302 also may be referred to as a plurality of separate segments, each segment adjacent two other segments. Together, segments 302 form a segmented cylinder having outer surface 306 of a cylindrical shape and inner channel 308 of a first conical shape. Each separate segment, including for example, first segment 310 and second segment 312, are configured to abut each other. When the separate segments all abut each other, outer surface 306 approximates a smooth outer surface of a cylinder having conical inner channel 308. However, when rod 304 is forced into inner channel 308, then segments 302 are forced part such that this cylindrical surface becomes discontinuous.

The second innermost portion of the illustrative embodiments is rod 304. Rod 304 may be characterized as a conical rod. Rod 304 is sized and dimensioned such that when rod 304 is advanced into inner channel 308, segments 302 are mechanically expanded in a radial direction. Thus, rod 304 may be characterized as slidably disposed within inner channel 308, the rod comprising a second conical shape, the second conical shape and the first conical shape sharing a similar conical aperture.

An individual segment, such as first segment 310, has a shape that is roughly pie-shaped in cross section, with a curved outwardly facing outer surface, flat side surfaces, and an inner surface that tapers from the apex of the pie shape to the end of first segment 310. An end of this pie-piece shaped segment is straight edged, rather than angled. The inner surface may be flat or curved, or generally configured to receive a corresponding section of an outer surface of rod 304. Thus, for example, the inner surface of second segment 312 has a flat shape to slidingly receive the flat shape of the outer surface of section 314 of rod 304. Ridges 316 on rod 304 may advance into gaps formed between individual ones of segments 302 as segments 302 separate as rod 304 is advanced inside inner channel 308, thus guiding rod 304 through inner channel 308. However, both the shape of the inner surface of second segment 312 and the shape of the outer surface of section 314 may be varied.

Accordingly, the term "conical shape" is used to describe both inner channel 308 and rod 304, as these shapes may be conical in nature but vary from a mathematically defined right circular cylinder. Finally, in an illustrative embodiment and as shown in FIG. 3, both rod 304 and inner channel 308 are frustoconical in shape, though these elements need not be frustoconical and could be other conical shapes.

Figure 4:
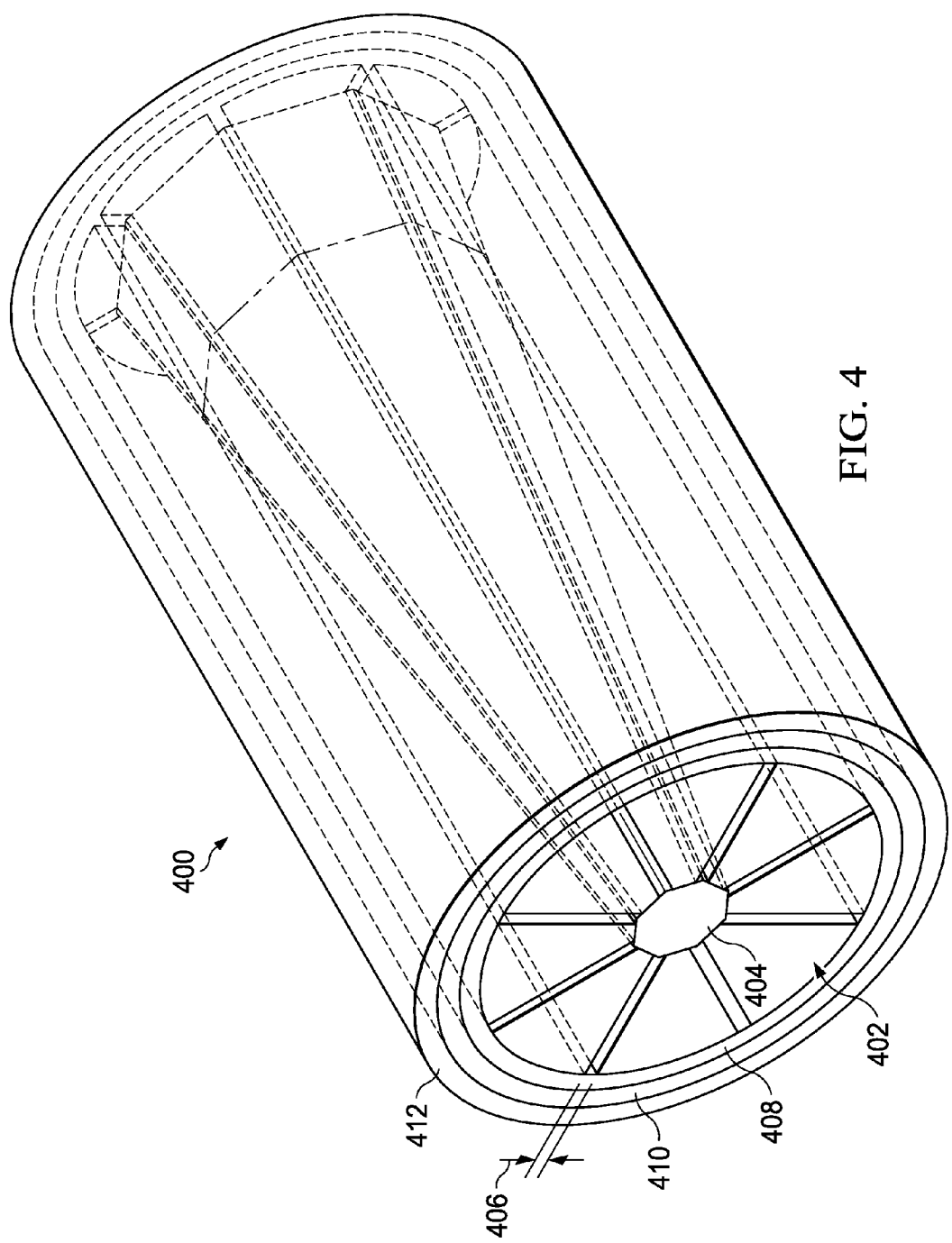
FIG. 4 illustrates another assembly for manufacturing a composite tubular structure, in accordance with an illustrative embodiment.

FIG. 4 illustrates another assembly for manufacturing a composite tubular structure, in accordance with an illustrative embodiment. In particular, assembly 400 of FIG. 4 may be assembly 300 of FIG. 3, in which rod 304 has been fully advanced into inner channel 308 defined by the segments taken together. Additionally, relative to FIG. 3, assembly 300 has been inserted into tube 408. Thus, segments 402 correspond to segments 302 of FIG. 3 and rod 404 corresponds to rod 304 of FIG. 3.

Because rod 404 has been fully advanced into the inner channel 308 (FIG. 3) defined by the inner surfaces of segments 402, segments 402 no longer abut each other. Instead, small spaces, such as space 406, now exist between each of segments 402. Additionally, advancing rod 404 forces segments 402 radially outwardly, thereby exerting an increasing applied pressure to any surface overlying the outer surface of segments 402.

Stated differently, rod 404 is a slidable conical solid device used to cause displacement to segments 402, which again may be characterized as cylindrical segments. Segments 402 may also be characterized as detachable solid cylindrical segments that can be displaced radially to exert an applied, uniform pressure onto a tube surrounding the segments, and thereby to any composite materials laid up on the tube. While the pressure is uniformly spread along a length of tube 408, the total pressure can be increased by advancing the rod within inner channel 308. Segments 402 may also be referred to as assembly of segments 402. The applied pressure may be varied according to the distance rod 404 is advanced into inner channel 308, the applied pressure increasing with further distance into inner channel 308.

Thus, for example, segments 402 are first inserted inside tube 408. Tube 408 may be referred-to as inner tube 408. Tube 408 may be composed of aluminum or other ductile or malleable metal, or perhaps some other ductile or malleable substance. The diameter of tube 408 is selected to be about the same size as, or slightly larger than, the diameter of the cylindrical shape formed by segments 402. Thus, when rod 404 is advanced into inner channel 308 formed by segments 402, the outer surface of segments 402 apply a uniform and even applied pressure to the inner surface of tube 408.

Variations in the applied pressure may occur where the spaces between segments contact the inner surface of tube 408, such as at the intersection of space 406 and the inner surface of tube 408. However, for many applications, the size and dimensions of rod 404, segments 402, and tube 408 will result in insignificant variations in the applied pressure to the inner surface of tube 408 at these spaces. Should these variations in applied pressure become significant, then segments 402 may be modified to be composed of additional segments. Thus, while eight segments are shown in segments 402, more or fewer segments could be present. The more segments that are present, the smaller spaces, such as space 406, will become and the less applied pressure will vary at the intersection of the spaces and the inner surface of tube 408. In some cases fewer segments may be preferred for ease of manufacturing segments 402 or rod 404, or to promote ease of insertion in some cases, so long as the pressure ultimately applied to composite layup 410 will be about even.

Overlying the outer surface of tube 408 is composite tubular layup 410. Composite tubular layup 410 may also be referred to as a composite tubular section. Composite tubular layup 410 may be fibers pre-impregnated with a resin, or a dry fiber layup to which resin is later added. One function of assembly 400 is to apply consistent uniform applied pressure along the length of composite tubular layup 410 during the consolidation or curing process of composite tubular layup 410. Thus, the assembly of rod 404, segments 402, tube 408, and composite tubular layup 410 are inserted into casing 412. Casing 412 may be referred to as outer tube 412. In turn, casing 412 is composed of a strong or thick metal or other suitable material capable of withstanding the applied pressure exerted by rod 404 when rod 404 is advanced an operational distance within tube 408. An "operational distance" is a typical distance rod 404 is advanced into tube 408 to reach a desired consolidation pressure. This operational distance may vary depending on the material to be consolidated or cured, the material or thickness of the inner tube, the consolidation technique used, or other factors. In some illustrative embodiments, inner channel 308 and rod 404 may be designed by modifying their respective conical apertures such that it is impossible or impractical for enough pressure to be exerted on segments 402 to cause casing 412 to deform.

Stated differently, casing 412 deforms at a first threshold pressure, but the applied pressure is selected to be less than the first threshold pressure. Accordingly, the "first threshold pressure" is defined as the pressure at which casing 412 will deform.

In use, as rod 404 is inserted into the inner channel 308 of segments 402, the inner segments 402 exert the uniform applied pressure to tube 408. Tube 408 deforms under this applied pressure, thereby applying uniform applied pressure to composite tubular layup 410. Stated differently, tube 408 deforms at a second threshold pressure, and the applied pressure is selected to be greater than the second threshold pressure. The second threshold pressure is reached when rod 404 advances past a threshold point within inner channel 308. Accordingly, the term "threshold point" is defined as a particular distance at which rod 404 is advanced along a longitudinal axis of segments 402, past which the applied pressure exerted by rod 404 will cause tube 408 to deform. This threshold point may be mathematically determined, as described with respect to FIG. 9.

As tube 408 deforms, the applied pressure is then transferred to the inner surface of casing 412, which is configured to resist deforming under the applied pressure. Accordingly, composite tubular layup 410 is squeezed between tube 408 and casing 412. Heat is applied, usually from a source external to casing 412. As a result, composite tubular layup 410 may be consolidated or cured under heat and applied pressure. Because the applied pressure exerted against composite tubular layup 410 may be controlled by changing distance rod 404 is advanced into inner channel 308 of segments 402, the applied pressure exerted against composite tubular layup 410 may be uniformly applied and precisely controlled. In turn, the distance rod 404 is advanced may be controlled using a pressure-applying device connected to rod 404, such as described with respect to FIG. 8.

Figure 5:
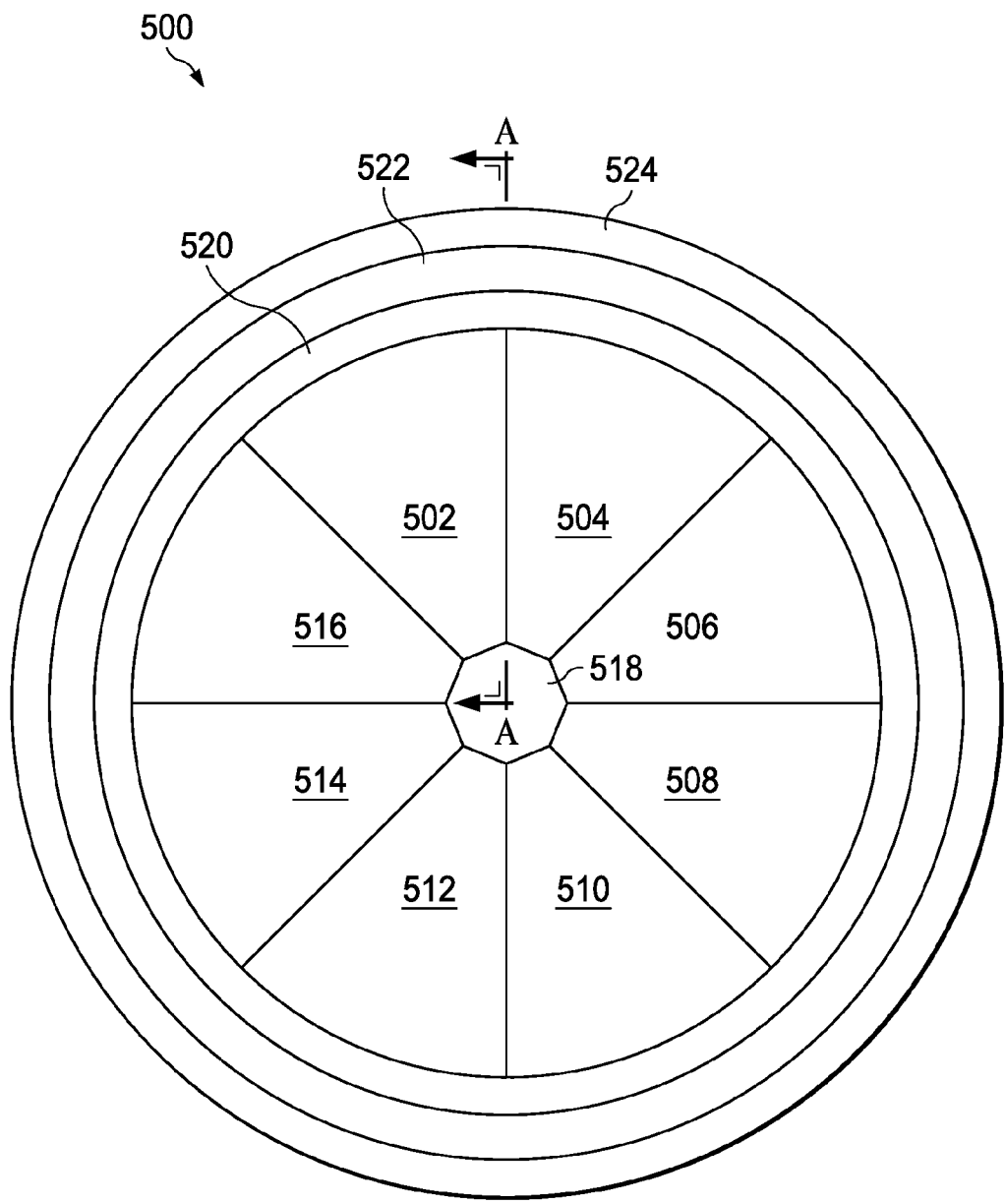
FIG. 5 illustrates a head-on view of the assembly shown in FIG. 4, in accordance with an illustrative embodiment.

FIG. 5 illustrates a head-on view of the assembly shown in FIG. 4, in accordance with an illustrative embodiment. Thus, assembly 500 corresponds to both assembly 300 of FIG. 3 and assembly 400 of FIG. 4.

Likewise, segments 302 of FIG. 3 and segments 402 of FIG. 4 correspond to the group of segments consisting of segment 502, segment 504, segment 506, segment 508, segment 510, segment 512, segment 514, and segment 516. Similarly, rod 304 of FIG. 3 and rod 404 of FIG. 4 correspond to rod 518.

In like manner, tube 408 of FIG. 4 corresponds to tube 520. Composite tubular layup 410 of FIG. 4 corresponds to composite tubular layup 522. Casing 412 of FIG. 4 corresponds to casing 524.

FIG. 5 also shows the location of cut-away "A-A". This cut-away is shown in FIG. 6 and is also shown in FIG. 7.

Figure 6:
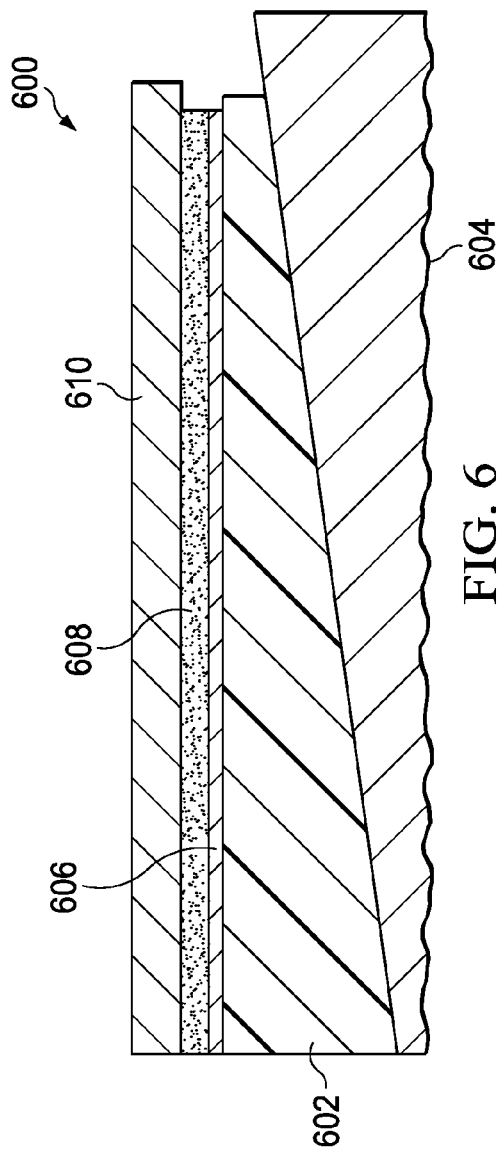
FIG. 6 illustrates a side view of the assembly shown in FIG. 4, in accordance with an illustrative embodiment.
Figure 7:
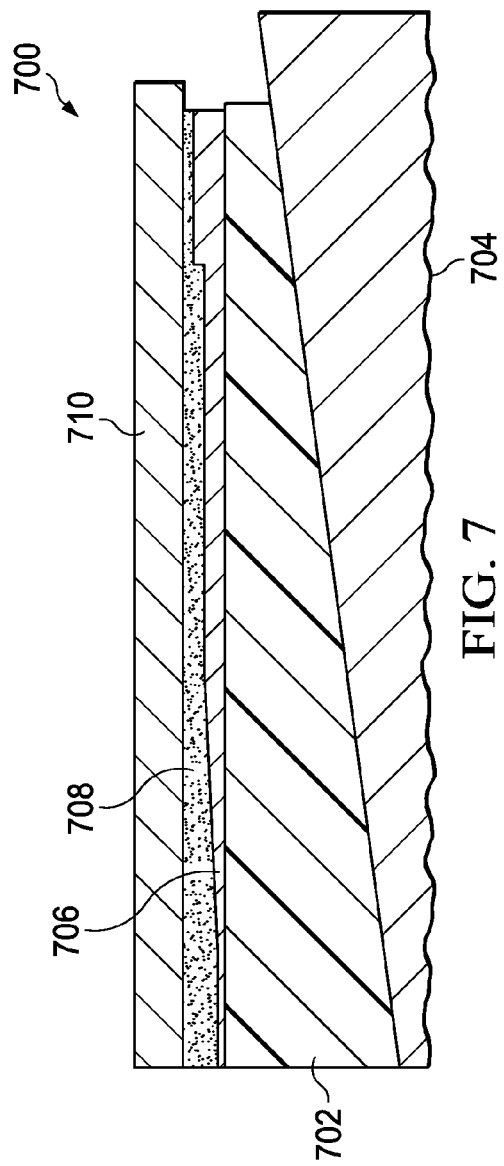
FIG. 7 illustrates a side view of a variation of the assembly shown in FIG. 4, in accordance with an illustrative embodiment.

Thus, FIG. 6 and FIG. 7 are described together. FIG. 6 illustrates a side view of the assembly shown in FIG. 4, in accordance with an illustrative embodiment. FIG. 6 also shows cut-away "A-A" mentioned in FIG. 5. FIG. 7 illustrates a side view of a variation of the assembly shown in FIG. 4, in accordance with an illustrative embodiment. FIG. 7 also shows another variation for cut-away "A-A" mentioned in FIG. 5.

Assembly 600 and assembly 700 both correspond to assembly 300 of FIG. 3, assembly 400 of FIG. 4, and assembly 500 of FIG. 5. Thus, segment 602 and segment 702 correspond to the side wall of segment 502 in FIG. 5, or to one of the segments in FIG. 3 or FIG. 4. Rod 604 and rod 704 correspond to rod 518 of FIG. 5.

Tube 606 and tube 706 correspond to tube 520 of FIG. 5. However, the thickness of tube 606 is about uniform along the longitudinal length of tube 606, whereas the thickness of tube 706 varies along the longitudinal length of tube 706. The thickness of the inner tube may be selected to accommodate differing thicknesses of composite material. Thus, composite tubular layup 608 has an about uniform thickness along its longitudinal length, whereas composite tubular layup 708 varies in thickness along its longitudinal length. The thickness of tube 706 may also be varied in order to apply differing applied pressures to composite tubular layup 708, as thinner areas of tube 706 may deform more easily than thicker areas.

In either case, a casing is provided. Thus, casing 610 and casing 710 is placed around composite tubular layup 608 or composite tubular layup 708, or alternatively a layup assembly is slid inside a casing. Casing 610 or casing 710 is configured to resist the applied pressure exerted by rod 604 or rod 704, respectively, so that composite tubular layup 608 or 708 respectively is squeezed against the casing when the inner tube deforms in response to the applied pressure from the rod being inserted inside the inner channel defined by the segment's inner surface.

Figure 8:
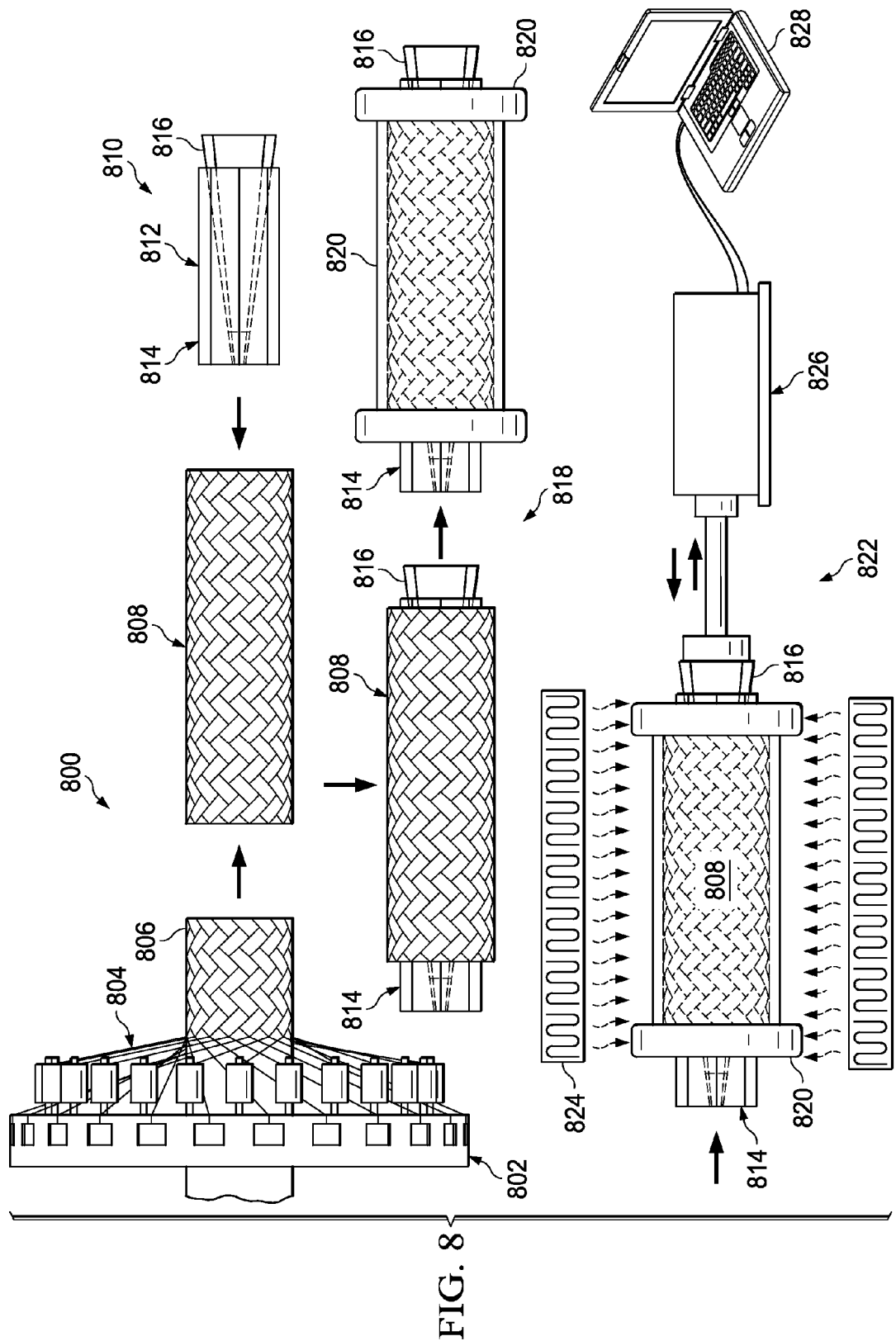
FIG. 8 illustrates a method for manufacturing a composite tubular structure using the assembly shown in FIG. 4, in accordance with an illustrative embodiment.

FIG. 8 illustrates a method for manufacturing a composite tubular structure using the assembly shown in FIG. 4, in accordance with an illustrative embodiment. FIG. 8 illustrates a use of the devices described above with respect to FIG. 3 through FIG. 7.

Initially, at operation 800, machine 802 braids thermoplastic material 804 onto tube 806, which may be a malleable metallic tube or some other material configured to expand when subjected to an applied pressure expected to be exerted during consolidation. When finished, braided tubular section 808 is produced.

Similarly for thermoset material systems, at operation 800, machine 802 braids thermoplastic material 804 onto tube 806, which may be a malleable metallic tube or some other material configured to expand when subjected to an applied pressure expected to be exerted during curing. Thermoplastic material 804 may also be characterized as a dry thermoset material. The epoxy resin is then infused into the dry thermoset material after the metallic casing is installed. When finished, braided tubular section 808 is produced.

Operation 800 may be varied. For example, machine 802 may be a tape laying machine and thermoplastic material 804 may instead be a pre-impregnated fiber tape or a dry fiber tape to which resin is later added. The material laid down on tube 806 need not be braided, but may be woven in other patterns or simply laid down one layer over another. Thus, the illustrative embodiments are not limited to the example shown in FIG. 8.

Thereafter, at operation 810, assembly 812 is inserted into tubular section 808, or overbraided onto assembly 812 or 814 as necessary. Assembly 812 may be assembly 300 of FIG. 3. Assembly 812 may be referred to as a cylindrical mechanical pressure device. Assembly 812 may include segments 814 which, while separated, together define a conical inner channel and a cylindrical outer surface, into which conical rod 816 may be inserted. In some cases, conical rod 816 may be partially advanced into segments 814 while assembly 812 is inserted into tubular segment 808. Assembly 812 may have other features, as described above with respect to FIG. 3, and also with respect to FIG. 4 through FIG. 7.

Thereafter, at operation 818, tubular segment 808 is inserted into casing 820. Assembly 812 remains inside tubular section 808. While FIG. 8 shows segments 814 protruding from one end of tubular section 808 and rod 816 protruding from the other end of tubular section 808, in other illustrative embodiments one or both ends of assembly 812 might not protrude from tubular section 808. In most illustrative embodiments, assembly 812 will fill the length of tubular section 808, but in some illustrative embodiments possibly less than all of tubular section 808 is filled by assembly 812.

Thereafter, at operation 822, heat and applied pressure are applied to the material being consolidated or cured, such as thermoplastic material 804, respectively. In an illustrative embodiment, heater 824 applies heat externally to casing 320 of FIG. 3. This heat conducts through casing 820 and to tubular section 808. While heat is applied, pressure device 826 advances rod 816, which in turn exerts the applied pressure to the inside surface of tubular section 808. In response, the malleable tube expands and exerts the applied pressure to thermoplastic material 804 or other substance under consolidation or curing. As casing 820 does not expand, thermoplastic material 804 or other substance is squeezed. Under heat and pressure, thermoplastic material 804 undergoes consolidation.

The application of pressure and heat consolidates thermoplastic material 804. Eventually, the heat is removed and the applied pressure is relieved by retracting rod 816 out of the channel in segments 814. Tubular section 808 is then removed from casing 820. Assembly 812 is removed from tubular section 808. In some cases, tube 806 may be removed from thermoplastic material 804, leaving only a finished composite tube.

This process may be varied. For example, pressure device 826 may vary the applied pressure exerted before, during, or after the application of heat. In an illustrative embodiment, computer 828 may control pressure device 826, heater 824, or both. Computer 828 may also monitor the heat, pressure, or both during the consolidation process.

Computer 828 may include a processor and a non-transitory computer readable storage medium in communication with the processor. The non-transitory computer readable storage medium may include instructions, which when executed by the processor, carry out a computer implemented method for controlling the applied pressure and/or heat during the consolidation process.

Other variations are possible. For example, more or fewer inner tubes may be present, such that two or more tubes are present inside tube 806. Multiple layers of composite material may be present separated by tubes. Additional casings may be present. Still other variations are possible; thus, the illustrative embodiments described with respect to FIG. 8 do not necessarily limit the claimed inventions.

Figure 9:
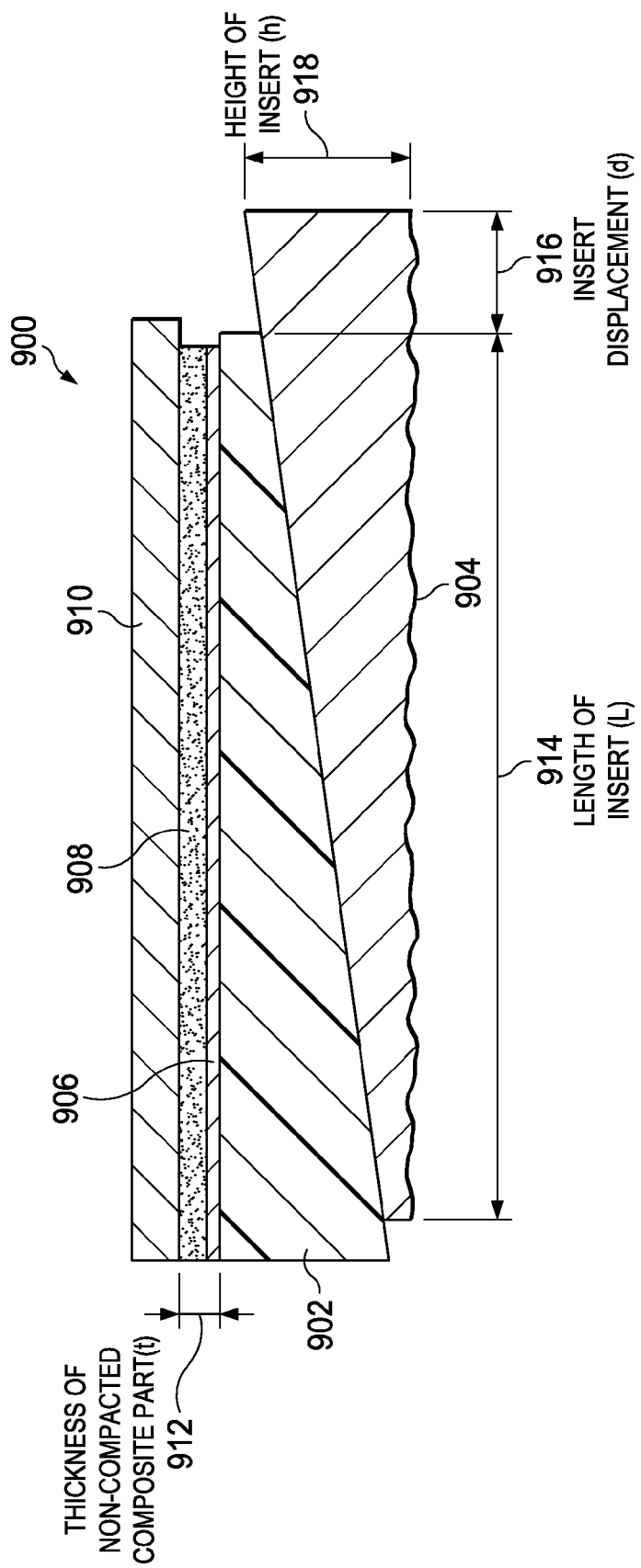
FIG. 9 illustrates a side view of a variation of the assembly shown in FIG. 4, in accordance with an illustrative embodiment.

FIG. 9 illustrates a side view of a variation of the assembly shown in FIG. 4, in accordance with an illustrative embodiment. Specifically, FIG. 9 shows certain measurements of the illustrative devices of FIG. 3 through FIG. 7 that may be useful in using an equation calculated by computer 828 of FIG. 8 in controlling a consolidation process of a thick composite tubular structure.

Assembly 900 approximates assembly 600 of FIG. 6. Thus, segment 902 corresponds to segment 602 of FIG. 6, rod 904 corresponds to rod 604 of FIG. 6, tube 906 corresponds to tube 606 of FIG. 6, composite tubular structure 908 corresponds to composite tubular layup 608 of FIG. 6, and casing 910 corresponds to casing 610 of FIG. 6.

FIG. 9 shows several measurable parameters, or dimensions of interest, of assembly 900 usable in controlling the applied pressure exerted against composite tubular structure 908 during consolidation or curing. Thickness (t) 912 is the thickness of composite tubular structure 908, before compaction. Length (L) 914 is the length of rod 904, which also may be referred to as an insert. Displacement (d) 916 refers to the distance rod 904 is advanced into the inner channel defined by segment 902. Height (h) 918 refers to the maximum length of rod 904 at its base. If rod 904 is approximately a circular cylinder, then height (h) 918 will be the radius of rod 904.

Using the above parameters, the applied pressure exerted on composite tubular structure 908 can be estimated. Specifically, the applied pressure exerted on composite tubular structure 908 may be estimated using the following equation:

$$P=(h/L)*(d/t)*E \qquad (1)$$

In equation (1), "h" refers to height (h) 918, "L" refers to length (L) 914, "d" refers to displacement (d) 916, "t" refers to thickness (t) 912, and "E" refers to a modulus of composite tubular structure 908. This modulus may vary with temperature. Equation (1), tends to be linear, but may become non-linear depending on the behavior of the modulus at different temperatures.

Using equation (1), an operator of computer 828 of FIG. 8 may estimate the applied pressure (P) that will be applied to composite tubular structure 908 when rod 904 is advanced a particular distance in the channel defined by segment 902. This applied pressure (P) can also be monitored. Automatic pressure control may be performed using a feedback system, taking the monitored applied pressure and the pressure applied to rod 904 as input and modifying the pressure applied to rod 904 accordingly.

While at a desired consolidation or curing pressure, to compress the composite tubular structure 908, applied pressure (P) will be less than a first threshold pressure. The first threshold pressure is the pressure at which casing 910 will begin to deform. Thus, deformation of casing 910, also referred to as outer tube 910, is avoided. However, while at the desired consolidation or curing pressure, the applied pressure (P) will be greater than a second threshold pressure. The second threshold pressure is the pressure at which tube 906 will begin to deform and then press against composite tubular structure 908. Tube 906 may also be referred to as inner tube 906. Accordingly, the applied pressure (P) will be great enough to deform tube 906 but not great enough to deform casing 910. Hence, composite tubular structure 908 will be compressed or squeezed at the applied pressure (P) between tube 906 and casing 910.

Figure 10:
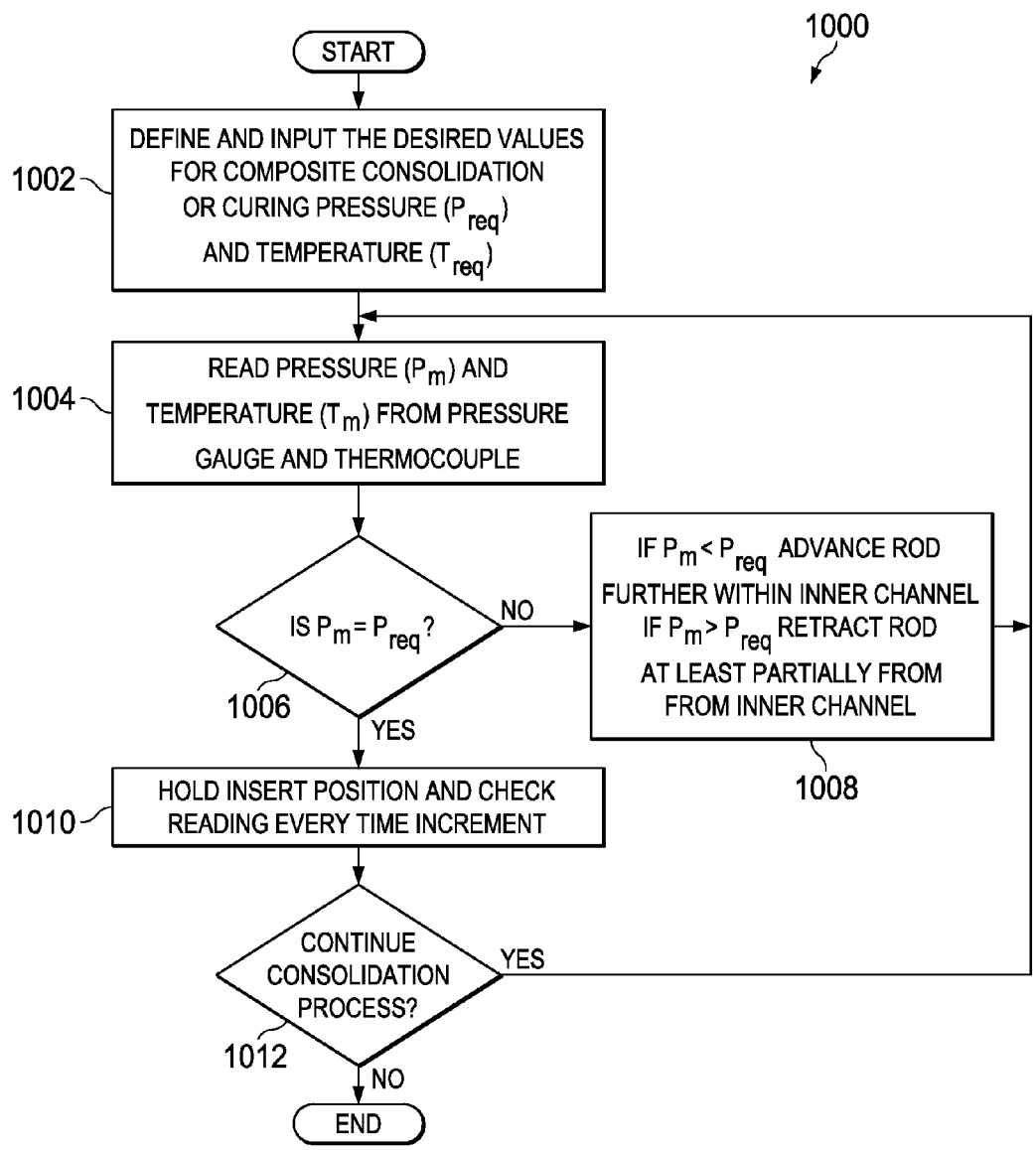
FIG. 10 illustrates a method for manufacturing a composite tubular structure using the assembly shown in FIG. 4, in accordance with an illustrative embodiment.

FIG. 10 illustrates a method for manufacturing a composite tubular structure using the assembly shown in FIG. 4, in accordance with an illustrative embodiment. Method 1000 may also be used with any of assembly 500 in FIG. 5 to assembly 900 in FIG. 9. Method 1000 may be implemented using computer 828 of FIG. 8.

Method 1000 begins by defining and inputting the desired values for composite consolidation or curing pressure ($P_{req}$) and temperature ($T_{req}$) (operation 1002). Thereafter, measured pressure ($P_m$) and measured temperature ($T_m$) are read from a pressure gauge and thermocouple (operation 1004). The pressure gauge and thermocouple may be operatively attached to the assembly used to consolidate the composite tubular structure, such as assembly 400 shown in FIG. 4. Other instruments for measuring pressure and temperature may also be used.

The applied pressure may be exerted by a rod, such as rod 404 in FIG. 4, by inserting the rod into an inner channel of an inner tube, such as inner channel 308 of FIG. 3 of tube 408 of FIG. 4. The relationship between the applied pressure and the extent the rod is advanced into the inner channel is defined by equation (1), expressed above with respect to FIG. 9.

After reading the pressure and temperature at operation 1004, a determination is made, whether the measured pressure is equal to the desired pressure. That is, a determination is made whether $P_m=P_{req}$ (operation 1006). If not (a "no" determination at operation 1006), then if $P_m<P_{req}$ then the rod is advanced further within the inner channel. Alternatively, if $P_m>P_{req}$ then the rod is retracted at least partially from the inner channel (operation 1008). Again, the distance in the channel the rod is advanced or retracted to achieve a given pressure is defined by equation (1), expressed above with respect to FIG. 9.

Stated differently, if the measured pressure is less than the desired pressure, then the rod is further advanced a pre-determined distance increment into the inner channel defined by the segments. The amount of advancement that constitutes a pre-determined distance may be calculated by equation (1) to achieve the desired pressure. The pre-determined distance may be any desired distance. The pre-determined distance may be replaced by continuous advancement of the rod until the desired pressure is achieved.

However, if the measured pressure is greater than the desired pressure, then the rod is retracted an incremental distance from the inner channel defined by the segments. The amount of incremental retraction may be calculated to achieve the desired pressure using equation (1), above. Alternatively, the amount of incremental retraction may be any desired distance, or may be replaced by continuous retraction of the rod until the desired pressure is achieved.

In another illustrative embodiment, the temperature during consolidation or curing of the composite material can be similarly monitored and regulated. Thus, the temperature may be increased or decreased as desired, in order that the measured temperature reaches a desired consolidation or curing temperature.

Returning to operation 1006, if $P_m=P_{req}$ (a "yes" determination), then the insert position is held and pressure readings are checked at every time increment (operation 1010). In other words, if the measured pressure is at the desired pressure, then the rod is not moved within the inner channel defined by the segments. Additionally, pressure is monitored at specified time increments, but may be monitored continuously.

A decision is then made whether to continue the consolidation or curing process (operation 1012). If so (a "yes" determination at operation 1012), then the process returns to operation 1004 and continues. If not (a "no" determination at operation 1012), then the process may terminate thereafter.

Method 1000 may be varied. For example, only pressure or only temperature may be monitored and adjusted. Other operations may be added or removed. Thus, method 1000 does not necessarily limit the claimed inventions.

Figure 11:
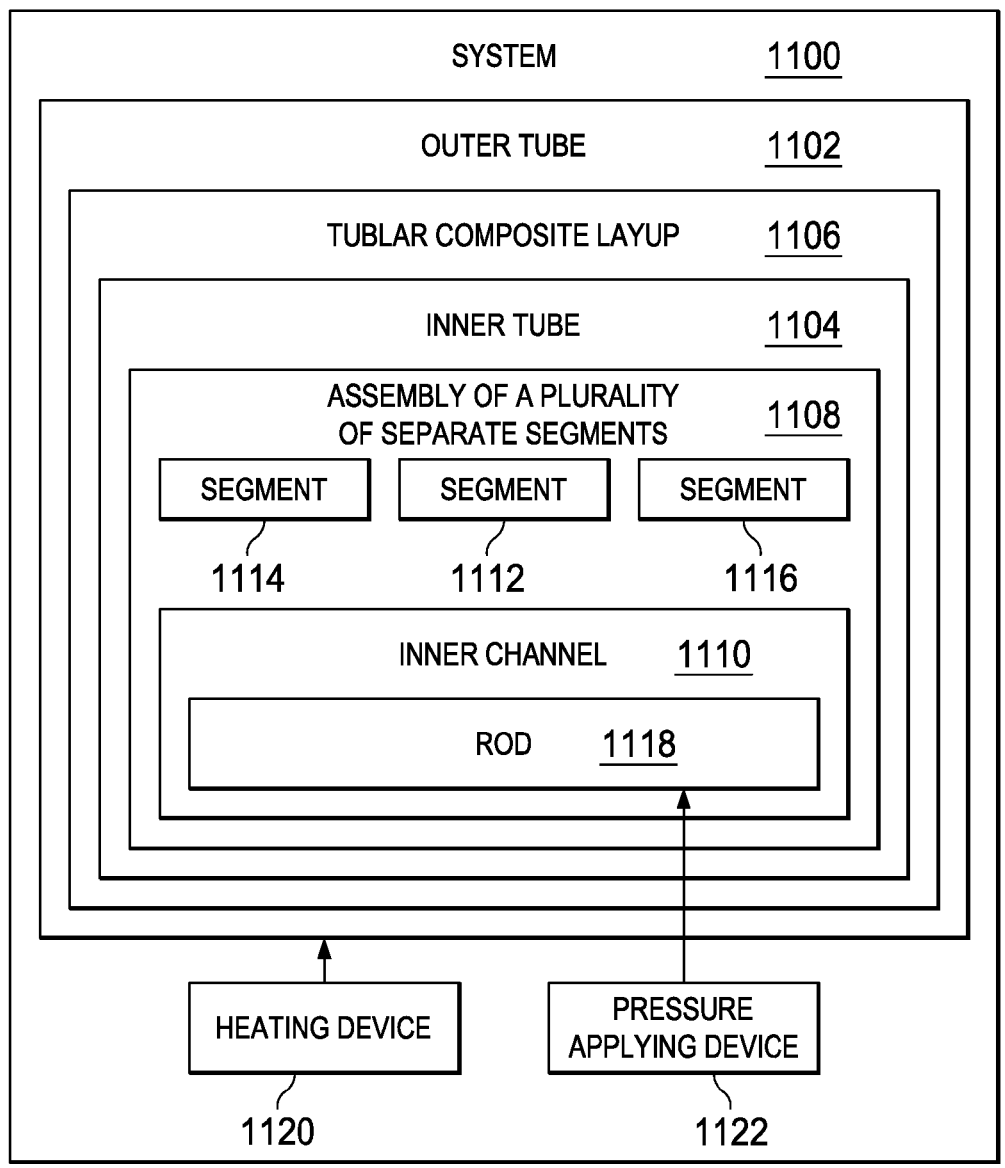
FIG. 11 illustrates another assembly for manufacturing a composite tubular structure, in accordance with an illustrative embodiment.

FIG. 11 illustrates another assembly for manufacturing a composite tubular structure, in accordance with an illustrative embodiment. System 1100 may be a variation of assembly 400 of FIG. 4. System 1100 may also be a variation of assembly 500 of FIG. 5, assembly 600 of FIG. 6, assembly 700 of FIG. 7, or assembly 900 of FIG. 9. System 1100 may be used in operation 822 of FIG. 8 or operations 1008 and 1010 of FIG. 10.

System 1100 may be used for manufacturing a composite tubular structure. System 1100 includes outer tube 1102. Outer tube 1102 may be configured to remain rigid up to at least a first threshold pressure. System 1100 also includes inner tube 1104. Inner tube 1104 is internal to outer tube 1102 and is substantially coaxial with outer tube 1102. As used herein the term "substantially coaxial" means that the tubes share about the same axis, typically within 10% of an exact coaxial relationship. Inner tube 1104 has a first outer surface Inner tube 1104 is configured to remain rigid up to a second threshold pressure that is less than the first threshold pressure.

Composite tubular layup 1106 is laid on the first outer surface of inner tube 1104 before inner tube 1104 is placed inside outer tube 1102. An assembly of a plurality of separate segments 1108 is disposed inside inner tube 1104. Each segment is adjacent to other segments to form a segmented inner cylinder having a second outer surface of a cylindrical shape and inner channel 1110 of a first conical shape. Thus, for example, segment 1112 is adjacent both segment 1114 and segment 1116.

System 1100 also may include rod 1118 slidably disposed within inner channel 1110. Rod 1118 may have a second conical shape. The second conical shape and the first conical shape may share a similar conical aperture, with the rod 1118 dimensioned to fit inside the inner channel 1110.

Rod 1118 may have a size that is configured such that rod 1118 will exert a substantially uniform applied pressure onto the plurality of separate segments 1108 as rod 1118 is advanced into inner channel 1110. While the overall applied pressure exerted on the inner tube is substantially uniform across the length of the inner tube, the applied pressure may be varied. In other words, the total applied pressure may be increased or decreased, but the total applied pressure remains uniformly distributed across the inner surface of the inner tube.

The applied pressure may vary based on a distance which rod 1118 is advanced in inner channel 1110. The pressure will increase as rod 1118 is advanced further into inner channel 1110 and will decrease as rod 1118 is retracted. The relationship between the distance the rod is advanced and the applied pressure is shown in equation (1), described with respect to FIG. 9.

When rod 1118 is inserted past a threshold point within inner channel 1110, the applied pressure will exceed the second threshold pressure but be less than the first threshold pressure. Thus, when rod 1118 is inserted past the threshold point, the inner tube will deform and apply pressure to the composite tubular layup. The exact location of the threshold point within inner channel 1110 may be calculated by using equation (1), above, using the pressure value at which the inner tube will begin to deform. The threshold point may vary for different inner tubes and even for the same tube used in a different consolidation or curing process. The threshold point may vary with the thickness of the material under consolidation or curing, the consolidation or curing process selected (which may require different pressures), the material and thickness of the inner tube, and other parameters. Nevertheless, the threshold point for a given process may be determined as defined above.

System 1100 may be varied. For example, the first conical shape may have a first frustoconical shape and the second conical shape may have a second frustoconical shape. In another illustrative embodiment, outer tube 1102 may be a rigid metallic substance with a desired thermal conductivity. Inner tube 1104 may be a ductile metallic substance with a desired thermal conductivity. In a specific non-limiting example, outer tube 1102 may be titanium or aluminum and inner tube 1104 may be aluminum.

In yet another illustrative embodiment, system 1100 may also include heating device 1120. Heating device 1120 may be configured to apply heat to outer tube 1102. In this case, outer tube 1102 may be titanium or steel and inner tube 1104 may be aluminum.

In another illustrative embodiment, composite tubular layup 1106 may be a braided thermoplastic material. However, composite tubular layup 1106 may also be other appropriate composite materials, such as a pre-preg tape, a dry fiber tape to which resin is later added, or other suitable composite material.

In another illustrative embodiment, system 1100 may also include pressure applying device 1122. Pressure applying device 1122 may be configured to apply a pressure to a base of rod 1118. In this illustrative embodiment, pressure applying device 1122 may be further configured to advance or retract rod 1118 within inner channel 1110 to control the applied pressure exerted on inner tube 1104 via assembly of a plurality of separate segments 1108.

In another illustrative embodiment, rod 1118 has an outer surface that has multiple flat surfaces. In this case, plurality of separate segments 1108 may have corresponding flat inner surfaces under which rod 1118 is slidable.

Other variations are possible. Thus, the illustrative embodiments shown in FIG. 11 do not necessarily limit the claimed inventions.

Figure 12:
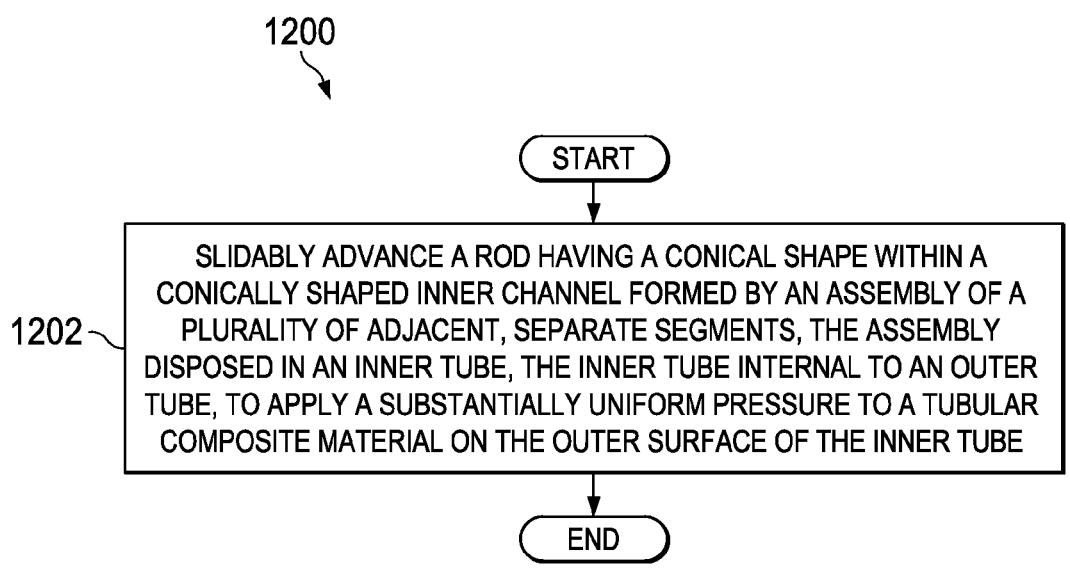
FIG. 12 illustrates a method for manufacturing a substantially uniform composite tubular structure using the assembly shown in FIG. 11, in accordance with an illustrative embodiment.

FIG. 12 illustrates a method for manufacturing a substantially uniform composite tubular structure using the assembly shown in FIG. 11, in accordance with an illustrative embodiment. Method 1200 may be implemented using the assembly shown in FIG. 3 through FIG. 11. Method 1200 may be a variation of the method shown in FIG. 8 or method 1000 shown in FIG. 10. Method 1200 specifically may be carried out using the devices shown in FIG. 8.

In an illustrative embodiment, method 1200 may include a single operation. Specifically, method 1200 may be slidably advancing a rod having a conical shape within a conically shaped inner channel formed by an assembly of a plurality of adjacent, separate segments, the assembly disposed in an inner tube, the inner tube internal to an outer tube, to apply a substantially uniform pressure to a composite tubular material on the outer surface of the inner tube (operation 1202). The process may terminate thereafter.

Method 1200 may be varied. For example, method 1200 may further include varying the substantially uniform pressure by changing an extent to which the rod is advanced within the inner channel. In this case, varying the substantially uniform pressure may be performed by a mechanical device advancing or retracting the rod.

In another illustrative embodiment, method 1200 may further include monitoring, using a computer in communication with the mechanical device, the extent the rod is advanced or retracted within the inner channel. In this case, method 1200 may include sensing the substantially uniform pressure using a sensor operably connected to the outer tube.

Method 1200 may have yet further variations. For example, the first conical shape may be a first frustoconical shape and the second conical shape may be a second frustoconical shape. Thus, the illustrative embodiments are not necessarily limited by the method shown in FIG. 12.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a composite tubular structure, the method comprising:
   slidably advancing a rod having a conical shape within a conically shaped inner channel formed by an assembly of a plurality of adjacent, separate segments, the assembly disposed in an inner tube, the inner tube internal to an outer tube, to apply a substantially uniform pressure to a composite tubular material on an outer surface of the inner tube.

2. The method of claim 1 further comprising varying the substantially uniform pressure by changing an extent to which the rod is advanced within the inner channel.

3. The method of claim 2, wherein varying the substantially uniform pressure is performed by a mechanical device advancing or retracting the rod.

4. The method of claim 3 further comprising:
   monitoring, using a computer in communication with the mechanical device, the extent the rod is advanced or retracted within the inner channel.

5. The method of claim 4 further comprising:
   sensing the substantially uniform pressure using a sensor operably connected to the outer tube.

6. The method of claim 5 further comprising:
   defining and inputting, using the computer, desired values for composite consolidation or curing pressure and temperature.

7. The method of claim 6 further comprising:
   reading temperature from a thermocouple in communication with the composite tubular material.

8. The method of claim 6 further comprising:
   determining whether the substantially uniform pressure is equal to a required pressure.

9. The method of claim 8 further comprising:
   if the substantially uniform pressure is not equal to the required pressure, and if the substantially uniform pressure is less than the required pressure, then advancing the rod further within the inner tube.

10. The method of claim 8 further comprising:
    if the substantially uniform pressure is not equal to the required pressure, and if the substantially uniform pressure is greater than the required pressure, then at least partially retracting the rod from within the inner tube.

11. The method of claim 8 further comprising:
    if the substantially uniform pressure is equal to the required pressure, then holding the rod at a location within the inner tube.

12. The method of claim 11 further comprising:
    checking the sensor at time increments.

13. The method of claim 12 further comprising:
    advancing or retracting the rod within the inner tube as pressure changes so as to maintain the substantially uniform pressure.

14. The method of claim 5 further comprising:
    prior to slidably advancing the rod, braiding a thermoplastic material onto a tube to form the composite tubular material.

15. The method of claim 14 further comprising:
    infusing the thermoplastic material with an epoxy resin.

16. The method of claim 5 further comprising:
    prior to slidably advancing the rod, braiding a pre-impregnated fiber tape over a tube to form the composite tubular material.

17. The method of claim 5 further comprising:
    prior to slidably advancing the rod, weaving a thermoplastic material in a pattern onto a tube to form the composite tubular material.

18. The method of claim 17 further comprising:
    infusing the thermoplastic material with an epoxy resin.

19. The method of claim 5 further comprising:
    prior to slidably advancing the rod, weaving a pre-impreganated fiber tape in a pattern onto a tube to form the composite tubular material.

* * * * *